United States Patent
Fujii et al.

(10) Patent No.: US 8,501,310 B2
(45) Date of Patent: *Aug. 6, 2013

(54) FOAM WATERPROOFING MATERIAL WITH A MICRO CELL STRUCTURE

(75) Inventors: Hiroki Fujii, Ibaraki (JP); Kazumichi Kato, Ibaraki (JP); Itsuhiro Hatanaka, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/735,879

(22) PCT Filed: Feb. 16, 2009

(86) PCT No.: PCT/JP2009/000596
§ 371 (c)(1),
(2), (4) Date: Aug. 23, 2010

(87) PCT Pub. No.: WO2009/107337
PCT Pub. Date: Sep. 3, 2009

(65) Prior Publication Data
US 2011/0171455 A1    Jul. 14, 2011

(30) Foreign Application Priority Data
Feb. 26, 2008 (JP) ................................ 2008-044240

(51) Int. Cl.
*B32B 3/26* (2006.01)

(52) U.S. Cl.
USPC .................. 428/315.7; 428/343; 428/355 AC

(58) Field of Classification Search
USPC ................... 428/315.7, 343, 355 AC
See application file for complete search history.

(56) References Cited

U.S. PATENT DOCUMENTS

| 8,211,953 B2 * | 7/2012 | Saitou et al. .................. 521/139 |
| 2002/0137809 A1 * | 9/2002 | Kogure et al. .................. 521/79 |
| 2005/0031858 A1 | 2/2005 | Tachibana |

(Continued)

FOREIGN PATENT DOCUMENTS

| JP | 55-071777 A | 5/1980 |
| JP | 2002-146072 A | 5/2002 |

(Continued)

OTHER PUBLICATIONS

International Search Report dated Apr. 28, 2009, issued in PCT/JP2009/000596.

(Continued)

*Primary Examiner* — Hai Vo
(74) *Attorney, Agent, or Firm* — Edwards Wildman Palmer LLP; James E. Armstrong, IV; Nicholas J. DiCeglie, Jr.

(57) ABSTRACT

To be provided is a foam waterproofing material superior in waterproofness and flexible enough to be compatible with further minute clearance.
The foam waterproofing material according to the present invention is a waterproofing material including a foam having a thickness of 0.1 to 1.0 mm, characterized in that the foam has a micro cell structure with an average cell diameter of 10 to 60 μm and an apparent density of 0.01 to 0.050 g/cm³. In the foam waterproofing material, the repulsive load when compressed to 0.1 mm (0.1 mm-compressive repulsion force) of the foam is preferably 0.01 to 0.1 MPa. The foam preferably has a closed-cell structure or a semi-open and semi-closed-cell structure. In addition, the foam may have a pressure-sensitive adhesive layer on one or both faces thereof. The pressure-sensitive adhesive layer is preferably formed on the foam via a film layer.

15 Claims, 3 Drawing Sheets

(56) References Cited

U.S. PATENT DOCUMENTS

| | | | |
|---|---|---|---|
| 2005/0053779 A1 | 3/2005 | Saitou et al. | |
| 2006/0110608 A1 | 5/2006 | Azumi et al. | |
| 2009/0209670 A1* | 8/2009 | Kanae et al. | 521/97 |
| 2010/0016458 A1* | 1/2010 | Saitou et al. | 521/134 |
| 2010/0233457 A1* | 9/2010 | Kato et al. | 428/220 |
| 2010/0239836 A1* | 9/2010 | Kato et al. | 428/220 |

FOREIGN PATENT DOCUMENTS

| | | | |
|---|---|---|---|
| JP | 2002-309198 A | | 10/2002 |
| JP | 2005-097566 A | | 4/2005 |
| JP | 2006-110773 A | | 4/2006 |
| WO | WO 2007119625 A1 | * | 10/2007 |
| WO | WO 2008041617 A1 | * | 4/2008 |
| WO | WO-2009/038005 A1 | | 3/2009 |

OTHER PUBLICATIONS

Notification of Reasons for Refusal issued in corresponding Japanese Patent Application No. JP2008-044240, dated May 14, 2013.

* cited by examiner

FOAM WATERPROOFING MATERIAL WITH A MICRO CELL STRUCTURE

TECHNICAL FIELD

The present invention relates to a foam waterproofing-material having micro cell structure.

BACKGROUND ART

Foam sheet materials have been used, for example, as seals and gaskets (sealing materials for fixing) in OA devices, computer-related devices, small communication devices such as cellular phones and small music-regenerating devices and others that demand waterproofness, air tightness, shock-absorbing properties and others. For example, known is a method of providing foams, such as open-cell polyurethane foams, with waterproofness by decreasing air permeability thereof by means of reducing the size of the cells therein and also adding a water-repellent hydrophobic additive (such as paraffin, wax, coal tar, asphalt or the like) thereto (see Patent Document 1). Also known is, for example, a rubber-based vulcanizing and foaming composition, specifically a mixture containing EPDM, a vulcanizing agent, a blowing agent, and a softener, that is useful in production of a low-density foam superior in water-cutoff efficiency and yet flexible enough for favorable operation (see Patent Document 2).

However in the case of the method of adding a hydrophobic additive to the foam (see Patent Document 1), the resin component and the hydrophobic component melt less easily, occasionally resulting in unevenness in cell diameter or non-uniformity of cell distribution and thus, causing a problem that it was not possible to obtain sufficient waterproofness because of fluctuation in water-cutoff efficiency. It was also difficult by the method above to achieve desired waterproofness only with the foam itself, because the average cell diameter of the waterproofing foam is higher at 100 μm or more, the surface area smaller and the air permeability higher.

In addition, it was occasionally difficult to obtain sufficiently high water-cutoff efficiency with the rubber-based vulcanizing and foaming composition containing EPDM, a vulcanizing agent, a blowing agent and a softener (see Patent Document 2), because the average cell diameter of the cells in the rubber-based foam obtained is higher at 1.0 to 1.5 mm, the surface area smaller and the air permeability higher.

Further, the clearance (opening) for such a waterproofing material in image display devices and optical members such as cameras and lenses, in which conventional waterproofing materials had been used, was sufficiently larger. Thus, these waterproofing materials could be used without intensive compression. For that reason, there was no particular need for attention to the compressive repulsion force of the waterproofing material.

However, products in which optical members are installed are made increasingly smaller in thickness recently and thus, the clearance of the region where the waterproofing material is used is seemingly reduced similarly. Accordingly, there exists a demand for a waterproofing material superior in waterproofness and also in flexibility that can be compatible with minute clearance.

Patent Document 1: Japanese Unexamined Patent Application No. 55-71777

Patent Document 2: Japanese Unexamined Patent Application No. 2002-146072

DISCLOSURE OF THE INVENTION

Problems to be Solved by the Invention

Accordingly, of the present invention is to provide a foam waterproofing material containing cells having small average cell diameter that is superior in waterproofness. Another object of the invention is to provide a foam waterproofing material superior in flexibility that can be used favorably when an optical member (containing the same) is installed in a product reduced in thickness and compatible with minute clearance.

Means to Solve the Problems

After intensive studies to achieve the objects above, the inventors have found that a waterproofing material including a foam having particular properties shows favorable waterproofness. The present invention was made based on these findings.

Specifically, the present invention relates to a waterproofing material comprising a foam, wherein the foam has a micro cell structure with an average cell diameter of 10 to 60 μm and an apparent density of 0.01 to 0.050 g/cm$^3$.

The repulsive load of the foam in the foam waterproofing material when compressed to 0.1 mm (0.1 mm-compressive repulsion force) is preferably 0.01 to 0.1 MPa.

In addition, the foam in the foam waterproofing material preferably has a closed-cell structure or a semi-open- and semi-closed-cell structure.

Further, the foam waterproofing material preferably has a pressure-sensitive adhesive layer on one or both faces of the foam.

The pressure-sensitive adhesive layer is preferably formed on the foam via a film layer.

The pressure-sensitive adhesive layer may be formed with an acrylic pressure-sensitive adhesive.

The foam may be formed in a step of impregnating a high-pressure inert gas in a thermoplastic polymer and leaving the resulting polymer under reduced pressure.

Alternatively, the foam waterproofing material may be formed in a step of impregnating a high-pressure inert gas in an unfoamed molding of a thermoplastic polymer and leaving the resulting molding under reduced pressure.

Yet alternatively, the foam waterproofing material may be formed in a step of impregnating a high-pressure inert gas in a molten thermoplastic polymer and leaving the resulting polymer under reduced pressure.

The foam is preferably formed, as the resin is left under reduced pressure and additionally under heat.

The inert gas for use is favorably carbon dioxide.

The inert gas used during impregnation is preferably in the supercritical state.

Advantageous Effect of the Invention

The foam waterproofing material according to the present invention in the configuration above has large surface area even at the same density and low air permeability, showing superior waterproofness. It is also favorably flexible enough to be compatible with minute clearance and thus, can be used favorably even when an optical member containing the foam waterproofing material is installed in a low-profile product.

EXPLANATION OF REFERENCES

Figure 1:
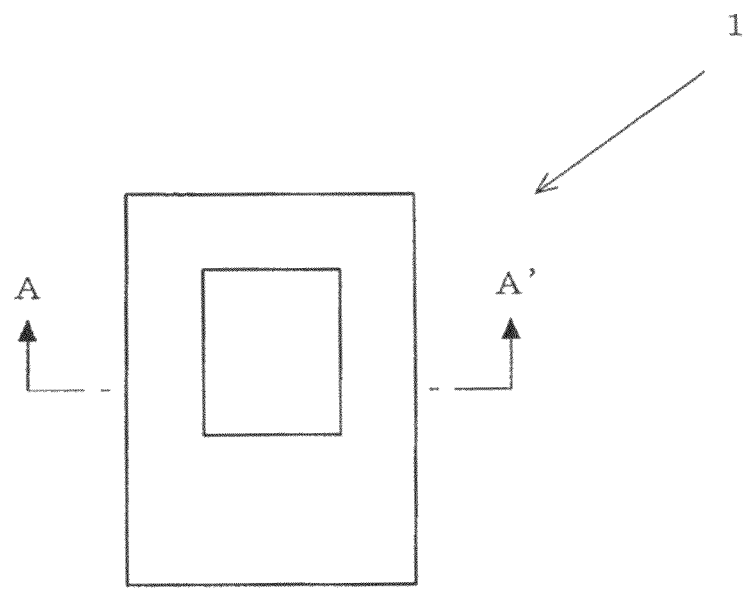
FIG. 1 is a front view illustrating the evaluation casing used in drip-proofness evaluation test.
Figure 2:
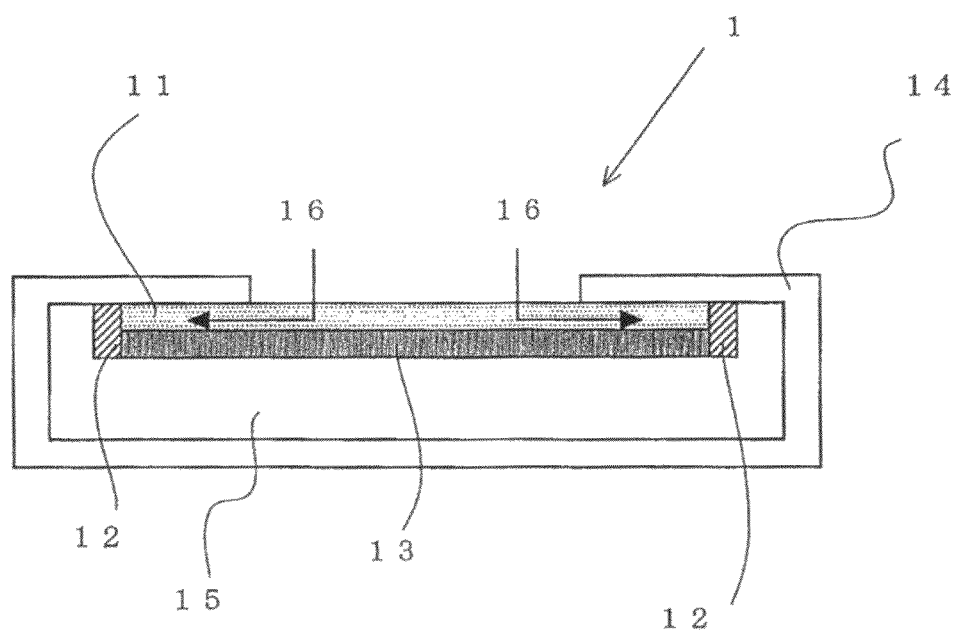
FIG. 2 is an expanded cross-sectional view along the line A-A' of the evaluation casing shown in FIG. 1.
Figure 3:
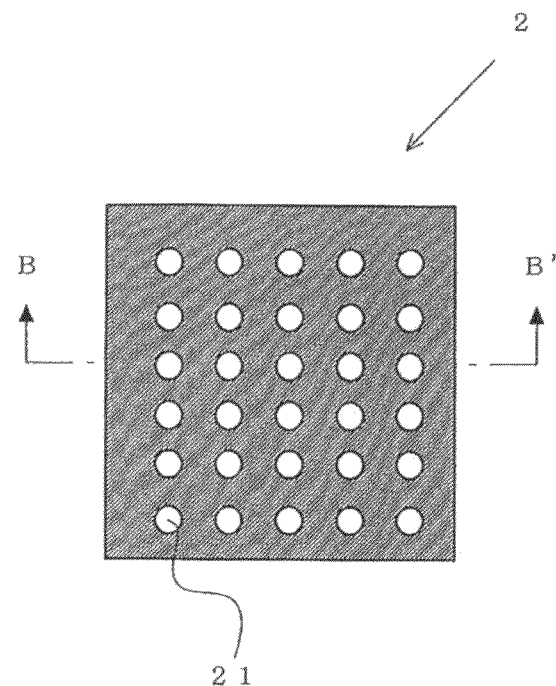
FIG. 3 is a top view illustrating the water-filled container used in the drip-proofness evaluation test.
Figure 4:
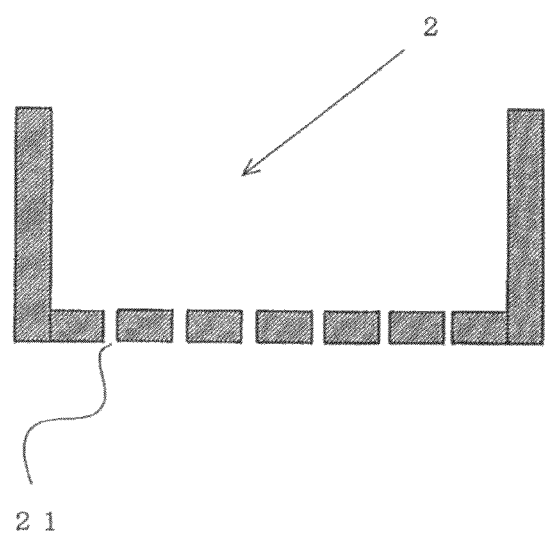
FIG. 4 is an expanded cross-sectional view along the line B-B' of the water-filled container shown in FIG. 3.

| | |
|---|---|
| 1: | Casing for evaluation of drip-proofness |
| 11: | Gasket-like shaped foam |
| 12: | Water-sensitive paper |
| 13: | Spacer |
| 14: | Casing for evaluation |
| 15: | Space |
| 16: | Flow of water |
| 2: | Tests container for evaluation of waterproofness |
| 21: | Empty hole (φ2) |
| 3: | Test apparatus for evaluation of water resistance |
| 31: | Measurement holder |
| 32: | Test piece |
| 33: | Pressure gauge |
| 34: | Valve |
| 35: | Pump |
| 36: | Water |

BEST MODE FOR CARRYING OUT THE INVENTION (Foam Constituting Foam Waterproofing Material)

The foam waterproofing material [waterproofing material (sealing material) including a foam] according to the present invention includes a foam having micro cell structure containing cells having an average cell diameter (average cell size) of 10 to 60 μm and having an apparent density of 0.01 to 0.050 g/cm$^3$. The average cell diameter of the foam is preferably 20 to 55 μm. Cells having an average cell diameter of more than 60 μm may cause, deterioration in waterproofness and also in light blocking efficiency of the foam. Alternatively, cells having an average cell diameter of less than 10 μm may cause deterioration in cushioning property (shock-absorbing property).

A foam having a repulsive load, as determined when compressed to a thickness of 0.1 mm (0.1 mm-compressive repulsion force), of 0.01 to 0.1 MPa is used favorably and that having a repulsive load of 0.02 to 0.04 MPa more preferably. When the repulsive load is more than 0.1 MPa, it becomes harder to prevent generation of troubles caused by repulsion of the foam waterproofing material, when it is conveyed through a region with narrow clearance. Alternatively, the repulsive load of less than 0.01 MPa may result in deterioration in waterproofness.

The thickness of the foam constituting the waterproofing material is normally 0.1 to 1.0 mm, preferably 0.2 to 0.6 mm. A thickness of more than 1.0 mm may lead to increase in 0.1 mm-compression repulsive load and a thickness of less than 0.1 mm to deterioration in waterproofness.

Further, the apparent density of the foam is 0.01 to 0.05 g/cm$^3$, preferably 0.02 to 0.04 g/cm$^3$. An apparent density of more than 0.05 g/cm$^3$ may lead to deterioration in flexibility. Alternatively, an apparent density of less than 0.01 g/cm$^3$ may lead to deterioration in waterproofness.

The composition and the cell structure of the foam are not particularly limited, if it has the properties described above.

But the cell structure is preferably, for example, a closed-cell structure or a semi-open- and semi-closed-cell structure (cell structure having both the closed- and open-cell structures), the ratio of which is not particularly limited. In particular, a cell structure having a closed-cell structure ratio of 80% or more in the foam is used favorably, and that having a ratio of 90% or more is used more favorably.

A foam having a water resistance (as determined by JIS L1092B method; foam thickness: 0.5 mm) of 40 kPa or more (e.g., 40 to 200 kPa) is used favorably, and that having a water resistance of 60 kPa or more (e.g., 60 to 150 kPa) is used more favorably. In the case of a water resistance of less than 40 kPa, it may not be possible to obtain sufficient waterproofness.

The foam for the foam waterproofing material according to the present invention can be prepared by a method commonly used in foaming such as physical, chemical or other method.

The physical method is a foam molding method of forming cells by dispersing a low-boiling-point liquid (blowing agent) such as a chlorofluorocarbon or a hydrocarbon in a polymer and vaporizing the blowing agent under heat. In the case of this blowing method, there is concern about the flammability and toxicity of the substance used as the blowing agent and the effects thereof on environment such as depletion of ozone layer.

Alternatively, the chemical method is a method of producing a foam by forming cells with a gas generated by thermal decomposition of a compound (blowing agent) added to the polymer base. Because the blowing gas remains in the foam in the case of the blowing method, there is a problem of contamination by the corrosive gas or the impurities in the gas, particularly in electronic device applications where low contamination is highly demanded.

It is difficult to form a micro cell structure, extremely difficult particularly to form micro sells of 300 μm or less in diameter, by any one of these physical and chemical blowing methods.

The foam can be produced, for example by a method of blending constituent components such as a natural or synthetic rubber (such as chloroprene rubber, ethylene, propylene or terpolymer), a vulcanizing agent, a blowing agent and a filler in a kneading machine such as Banbury mixer or pressurized kneader, molding it into the shape of sheet or rod, as the mixture is further blended, continuously by a calendaring machine, an extruder or a conveyor-belt casting machine, vulcanizing and foaming the blend under heat, and as needed cutting the cured foam into a predetermined shape. Alternatively, the foam can be produced by a method of blending constituent components such as a natural or synthetic rubber, a vulcanizing agent, a blowing agent and a filler by a mixing roll and vulcanizing, foaming and molding the blended composition batchwise in a mold.

In particular in the present invention, a method of using a high-pressure inert gas as the blowing agent, specifically a method of forming a foam by impregnating a high-pressure inert gas in a thermoplastic polymer and then leaving the polymer under reduced pressure, is used favorably, because it is possible to produce a foam having a smaller cell diameter and a higher cell density. In addition, use of carbon dioxide as the blowing agent is preferable, because it is possible to obtain a clean foam containing smaller amounts of impurities.

A production method of using a high-pressure inert gas as the blowing agent is used favorably as the method of producing a foam according to the present invention. In particular, a method of producing a foam by impregnating a high-pressure inert gas in a thermoplastic polymer and leaving it under reduced pressure is used favorably. In impregnation of the inert gas, the inert gas may be impregnated in a previously molded unfoamed material or alternatively, the inert gas may be impregnated in a molten thermoplastic polymer in the pressurized state.

Thus, the method of producing a foam according to the present invention is preferably a method of forming a foam by impregnating a high-pressure inert gas in a thermoplastic polymer, and leaving it under reduced pressure, a method of forming a form by impregnating a high-pressure inert gas in a unformed thermoplastic polymer material and leaving it under reduced pressure, or a method of forming a foam by impregnating an inert gas in a molten thermoplastic polymer under pressure and leaving and molding it under reduced pressure.

(Thermoplastic Polymer)

In the present invention, the thermoplastic polymer, a raw material for the foam (resin foam), is not particularly limited, if it is a thermoplastic polymer that can be impregnated with a high-pressure gas. Examples of the thermoplastic polymers include olefinic polymers such as low-density polyethylene, medium-density polyethylene, high-density polyethylene, linear low-density polyethylene, polypropylene, copolymers of ethylene and propylene, copolymers of ethylene or propylene and other α-olefins, and copolymers of ethylene and other ethylenic unsaturated monomers (such as vinyl acetate, acrylic acid, acrylic ester, methacrylic acid, methacrylic ester, vinyl alcohol, etc.); styrenic polymers such as polystyrene and acrylonitrile-butadiene-styrene copolymers (ABS resins); polyamides such as 6-nylon, 66-nylon and 12-nylon; polyamide-imides; polyurethanes; polyimides; polyether imides; acrylic resins such as polymethyl methacrylate; polyvinyl chlorides; polyvinyl fluorides; alkenyl aromatic resins; polyesters such as polyethylene terephthalate and polybutylene terephthalate; polycarbonates such as bisphenol A-based polycarbonates; polyacetals; polyphenylene sulfides and the like.

The thermoplastic polymers also include thermoplastic elastomers showing the properties of rubber at room temperature and the properties of thermoplastic resin at high temperature. Examples of the thermoplastic elastomers include olefinic elastomers such as ethylene-propylene copolymers, ethylene-propylene-diene copolymers, ethylene-vinyl acetate copolymers, polybutene, polyisobutylene and chlorinated polyethylenes; styrenic elastomers such as styrene-butadiene-styrene copolymers, styrene-isoprene-styrene copolymers, styrene-isoprene-butadiene-styrene copolymers and the hydrogenated derivative polymers thereof, thermoplastic polyester elastomers; thermoplastic polyurethane-based elastomers; thermoplastic acrylic elastomers and the like. Because these thermoplastic elastomers have, for example, a glass transition temperature of lower than room temperature (e.g., 20° C. or lower), they are remarkably superior in flexibility and shape compatibility when they are processed into a waterproofing material or a sealing material.

The thermoplastic polymers may be used alone or as a mixture of two or more. Alternatively, a thermoplastic elastomer, a thermoplastic polymer other than the thermoplastic elastomer, or a mixture of a thermoplastic elastomer and a thermoplastic polymer other than the thermoplastic elastomer may be used as the raw material (thermoplastic polymer) for the foam.

The mixture of a thermoplastic elastomer and a thermoplastic polymer other than the thermoplastic elastomer is, for example, a mixture of an olefinic elastomer such as an ethylene-propylene copolymer and an olefinic polymer such as polypropylene. When the mixture of a thermoplastic elastomer and a thermoplastic polymer other than the thermoplastic elastomer is used, the blending ratio of the former to the latter is, for example, approximately 1/99 to 99/1 (preferably approximately 10/90 to 90/10, more preferably approximately 20/80 to 80/20).

(Inert Gas)

The inert gases for use in the present invention is not particularly limited, if it is inactive to the thermoplastic polymer and can be impregnated, and examples thereof include carbon dioxide, nitrogen, air and the like. These gases may be used as they are mixed. Among the gases above, carbon dioxide, which is impregnated rapidly in larger amount in the raw material for the foam, a thermoplastic polymer, is particularly favorable.

The inert gas for impregnation into the thermoplastic polymer is preferably in the supercritical state. The gas is more soluble in the thermoplastic polymer and can be impregnated to higher concentration in the supercritical state. Because the gas is present at higher concentration during rapid pressure drop after impregnation, as described above, there are more cell nuclei generated, and the density of the cells formed by growth of the cell nuclei is higher, and thus, micro cells are formed, even if the porosity remains the same. The critical temperature of carbon dioxide is 31° C. and the critical pressure then is 7.4 MPa.

Additives may be added, as needed, to the thermoplastic polymer before the foam is formed. The kind of the additives is not particularly limited, and various additives commonly used in foaming may be used. Examples of the additives include foaming nucleators, crystal nucleators, plasticizers, lubricants, colorants (pigments, dyestuffs, etc.), shrinkage inhibitors, ultraviolet absorbers, antioxidants, age inhibitors, fillers, reinforcements, flame retardants, antistatic agents, surfactants, vulcanizing agents, surface-treating agents and the like. The addition amount of each additive can be selected properly in the range that does not impair cell formation or the like, and an addition amount commonly used in molding of thermoplastic polymers, such as common thermoplastic elastomers, can be used.

The lubricant has functions to improve the fluidity of the thermoplastic polymer and to inhibit thermal degradation of the polymer. The lubricant for use in the present invention is not particularly limited, if it is effective for improvement in fluidity of the thermoplastic polymer, and examples thereof include hydrocarbon-based lubricants such as liquid paraffin, paraffin waxes, microwaxes and polyethylene waxes; fatty acid-based lubricants such as stearic acid, behenic acid and 12-hydroxystearic acid; ester-based lubricants such as butyl stearate, stearic monoglyceride, pentaerythritol tetrastearate, hydrogenated castor oil and stearyl stearate and the like.

The shrinkage inhibitor has an action to inhibit permeation of the blowing gas effectively by forming a molecular film on the surface of the foam porous film. The shrinkage inhibitor for use in the present invention is not particularly limited, if it is effective in inhibiting permeation of the blowing gas, and examples thereof include fatty acid metal salts, fatty acid amides, fatty acid bisamides and the like.

(Preparation of Foam)

Specifically, the method of producing a foam by impregnating a high-pressure inert gas in a thermoplastic polymer is, for example, a method comprising a gas impregnation step of impregnating an inert gas in a thermoplastic polymer, a decompression step of foaming the resin under reduced pressure after the step above, and, as needed, a heating step of expanding the cells under heat. In this case, as described above, the inert gas may be impregnated in a previously molded unfoamed molding, or alternatively, the inert gas may be impregnated in a molten thermoplastic polymer under pressure and then, molded under reduced pressure. These steps may be carried out either batchwise or continuously.

In the case of batchwise operation, the foam can be prepared, for example, in the following manner: First, a thermoplastic polymer such as a polyolefin resin or a thermoplastic elastomer is extruded by an extruder, such as a single- or twin-screw extruder, into an unfoamed molding (i.e., resin sheet for formation of foam). Alternatively, thermoplastic polymers such as polyolefin resins and thermoplastic elastomers are blended uniformly in a kneading machine equipped with a roller, a cam, a kneader and a Banbury-type blade, and the blend is press-molded by a hot-plate pressing machine into an unfoamed molding (resin sheet for production of foam) containing the thermoplastic polymers as the base resin. The unfoamed molding obtained is placed in a pressure container; a high-pressure inert gas is introduced therein; and the inert gas is impregnated in the unfoamed molding. The shape of the unfoamed molding in this case is not particularly limited, and may be in the shape of roll, plate or the like. In addition, the high-pressure inert gas may be introduced continuously or uncontinuously. After sufficient impregnation of the high-pressure inert gas, the pressure is released (normally to atmospheric pressure), allowing generation of cell nuclei in the base resin. The cell nuclei may be grown, as the molding is left at room temperature or heated as needed. Heating may be carried out by a known or common method, for example, by using water bath, oil bath, heat roll, hot air oven, far-infrared ray, near-infrared ray, microwave or the like. After growth of the cells as described above, the molding is cooled rapidly, for example, with cold water, for stabilization of the shape.

Alternatively in the case of continuous operation, the foam is formed, for example, by the following manner: A high-pressure inert gas is injected into thermoplastic polymers, as they are blended in an extruder such as a single- or twin-screw extruder, for sufficient impregnation of the gas in the thermoplastic polymers, and the pressure is released (normally to atmospheric pressure) by extrusion of the blend, allowing simultaneous foaming and molding and, as needed, growth of the resulting cells by heating. After the cell growth, the molding is cooled rapidly, for example, with cold water for stabilization of the shape.

The pressure in the gas impregnation step is, for example, 6 MPa or more (e.g., approximately 6 to 100 MPa), preferably 8 MPa or more (e.g., approximately 8 to 100 MPa). A pressure of less than 6 MPa leads to acceleration of cell growth during foaming and thus to excessive increase in cell diameter, and thus, it is not possible to obtain a small average cell diameter (average cell size) in the range described above, prohibiting production of a foam with favorable waterproofing effect. It is because the amount of the gas impregnated when the pressure is low is relatively smaller than that when the pressure is high, leading to decrease in cell nucleus-forming speed and also in the number of the cell nuclei formed, which in turn leads to increase in the amount of the gas per cell and thus drastic increase in cell diameter. Alternatively when the pressure is in a low pressure region of lower than 6 MPa, slight change in impregnation pressure results in significant change in cell diameter and cell density, making it difficult to regulate the cell diameter and the bubble density.

The temperature in the gas impregnation step varies, for example, according to the kinds of the inert gas and thermoplastic polymers used and can be selected in a wide range. When the convenience of operation or the like is taken into consideration, it is, for example, approximately 10 to 350° C. The impregnation temperature when an inert gas is impregnated for example in a sheet-shaped unfoamed molding is, for example, approximately 10 to 200° C., preferably approximately 40 to 200° C., in the case of batchwise operation. Alternatively in the case of continuous operation, the impregnation temperature when a gas-impregnated molten polymer is foamed and molded simultaneously by extrusion is generally approximately 60 to 350° C.

In particular when carbon dioxide is used as the inert gas, the temperature during impregnation is preferably 32° C. or higher, particularly preferably 40° C. or higher, for preservation of the supercritical state.

The decompression rate in the decompression step is not particularly limited, but preferably, approximately 5 to 300 MPa/sec for obtaining uniform micro cells. The heating temperature in the heating step is, for example, approximately 40 to 250° C., preferably approximately 60 to 250° C.

The average cell diameter (average cell size), the repulsive load when compressed to 0.1 mm (0.1 mm-compressive repulsion force) and the apparent density may be altered, for example, according to the kind of the inert gas, the thermoplastic polymers and elastomers and to the additives used. These values can be regulated, by properly selecting and setting, for example, the operation condition of the gas impregnation step such as temperature, pressure and period and the operation condition of the decompression step such as decompression speed, temperature and pressure, and heating temperature after decompression.

(Foam Waterproofing Material)

The foam waterproofing material according to the present invention (foam sealing material) contains a foam having the particular properties described above. The foam waterproofing material can show the functions effectively even when it is made only of the foam, but may have another layer or a substrate (in particular, pressure-sensitive adhesive layer or the like) formed on one or both faces of the foam. For example, a foam waterproofing material in the shape having an pressure-sensitive adhesive layer on one or both faces of the foam can fix or temporarily connects members or parts, such as optical members, to an adherend. Thus, the foam waterproofing material according to the present invention preferably has a pressure-sensitive adhesive layer at least on one side (one side or both sides) of the foam constituting the foam waterproofing material.

The pressure-sensitive adhesive used in forming the pressure-sensitive adhesive layer is not particularly limited and, for example, known pressure-sensitive adhesives, such as acrylic pressure-sensitive adhesives, rubber-based pressure-sensitive adhesives (such as natural and synthetic rubber-based pressure-sensitive adhesives), silicone-based pressure-sensitive adhesives, polyester-based pressure-sensitive adhesives, urethane-based pressure-sensitive adhesives, polyamine-based pressure-sensitive adhesives, epoxy-based pressure-sensitive adhesives, vinyl alkylether-based pressure-sensitive adhesives and fluorine-based pressure-sensitive adhesives, can be used favorably, as they are selected properly. The pressure-sensitive adhesive may be a hot-melt pressure-sensitive adhesive. The pressure-sensitive adhesives above may be used alone or in combination of two or more. The pressure-sensitive adhesive may be a pressure-sensitive adhesive in any shape, such as an emulsion-based pressure-sensitive adhesive, a solvent-based pressure-sensitive adhesive, an oligomer-based pressure-sensitive adhesive or a solid pressure-sensitive adhesive.

An acrylic pressure-sensitive adhesive is used favorably as the pressure-sensitive adhesive for prevention of contamination of the adherend.

The pressure-sensitive adhesive layer can be formed by using a known or common process, and exemplary preparative methods include a coating method of applying a pressure-sensitive adhesive onto a predetermined site or surface and a transfer method of applying a pressure-sensitive adhesive on a release film, such as a release liner, to form a pressure-sensitive adhesive layer thereon and transferring the Pressure-sensitive adhesive layer onto to a predetermined site or surface. In formation of the pressure-sensitive adhesive layer, a known or common coating procedure, such as flow casting, coating with a roll coater, coating with a reverse coater or coating with a doctor blade, can be used, as properly selected.

The thickness of the pressure-sensitive adhesive layer is generally approximately 5 to 150 μm, and preferably approximately 10 to 100 μm.

The thickness of the pressure-sensitive adhesive layer is preferably smaller, because such a thin pressure-sensitive adhesive layer is more effective in preventing deposition of water drops on the edges thereof. The pressure-sensitive adhesive layer may have a single- or multilayer structure.

The pressure-sensitive adhesive layer may be formed on the foam via one or more other layers (underlayers). Exemplary underlayers include carrier layer (particularly of film layer), other pressure-sensitive adhesive layer, intermediate layer and undercoat layer.

When the pressure-sensitive adhesive layer is formed only on one face of the foam, one or more other layers may be formed on the other face of the foam. Examples of such other layers include pressure-sensitive adhesive layers of other types and carrier layer.

The shape and the thickness of the foam waterproofing material according to the present invention are not especially limited and can be chosen properly, for example, according to the intended use. However, the thickness of the foam waterproofing material most favorable to minute clearance of 0.10 to 0.20 mm can be selected in the range of 0.105 to 1.3 mm, preferably in the range of about 0.22 to 0.7 mm.

The foam waterproofing material is converted to and used as products, normally as it is processed into various shapes suitable for intended devices.

The foam waterproofing material according to the present invention, which has the above-mentioned characteristic properties, contains very micro cells, has low repulsive load when compressed to 0.1 mm (0.1 mm-compressive repulsion force), is superior in flexibility, and has low apparent density. It has flexibility high enough to be compatible with extremely minute clearance and yet retains cells smaller in cell diameter (cell size). Favorably for that reason, the foam waterproofing material can be compatible with further minute clearance, while retaining the waterproofness essentially needed. In addition, it is highly expanded and light-weighed.

The foam is superior in flexibility, because it is made of a thermoplastic polymer (e.g., a thermoplastic elastomer), and cleaner without generation of harmful substances and residual of contaminants, compared to the foams prepared by conventional physical and chemical foaming methods, because it is prepared by using an inert gas. The foam waterproofing material can therefore be used favorably, particularly as a waterproofing material for use in electronic devices.

The foam waterproofing material according to embodiments of the present invention is useful as a waterproofing material for use in mounting (installing) various members or parts (such as optical members) on predetermined sites. In particular, the foam waterproofing material can be used favorably, even when small-sized members or parts (such as small-sized optical members) are installed in low-profile products.

Exemplary optical members that can be mounted (installed) via the foam waterproofing material include image display units (particularly, small-sized image display units) to be mounted in image display devices such as liquid crystal display devices, electroluminescent display devices and plasma display devices; and cameras and lenses (particularly, small-sized cameras and lenses) to be mounted in mobile communication devices such as so-called "cellular phones" and "personal digital assistants".

(Structure Including Optical Members)

It is possible, by using the foam waterproofing material according to the present invention, to obtain a structure in which optical members are mounted (installed) via the foam waterproofing material on particular unit sites. Examples of the structures include image display devices (particularly, image display devices having small-sized image display materials as the optical members) such as liquid crystal display devices, electroluminescence display devices and plasma display devices, and mobile communication devices containing cameras and lenses (particularly, small-sized cameras and lenses) as optical members, such as so-called "cellular phones" and "personal digital assistants". The structure may be a product thinner than conventional products, and the thickness and the shape thereof are not particularly limited.

(Waterproofing Structure)

The foam waterproofing material according to the present invention gives a waterproofing structure in which optical members are mounted (installed) via the foam waterproofing material. The waterproofing structure is not particularly limited in structure, if the foam waterproofing material is used when optical members are mounted (installed) on predetermined sites. Accordingly, the optical member and the predetermined site on which the optical member is mounted are not particularly limited and can be selected properly, and examples of the optical members include the optical members described above.

EXAMPLES

Hereinafter, the present invention will be illustrated in more detail with reference to examples, but it should be noted that these examples are not to be construed to limit the scope of the present invention. The average cell diameter (average cell size) of foam, the repulsive load when compressed to 0.1 mm, and the apparent density were determined according to the following methods.

(Average Cell Diameter)

The average cell diameter (μm) of a sample foam was determined by capturing an enlarged image of a cellular portion of the foam using a digital microscope (trade name: "VHX-500", supplied by Keyence Corporation) and analyzing the captured image with image analysis software (trade name: "Win ROOF", supplied by Mitani Corporation).

(Repulsive Load when Compressed to 0.1 Mm)

The repulsive load was determined, according to JIS K6767. The 0.1 mm-compression repulsive load (MPa) was determined by compressing a test piece cut from a foam into a circular form having a diameter of 20 mm to 0.1 mm at a compression rate of 2.54 mm/min, converting the stress (N) obtained then to a value per unit area ($cm^2$) and additionally dividing it by 100.

(Apparent Density)

A sample foam was punched into a square test sample with a punching blade of 100 mm wide and 100 mm long, and the dimensions of the punched sample were measured. The thickness of the sample was measured with a $\frac{1}{100}$-scaled dial gauge having a measuring terminal of 20 mm in diameter (ϕ). The volume of the foam was calculated from these values. Next, the weight of the foam was measured on an even balance having a minimum scale of 0.01 g or more. The apparent density (g/cm³) of the foam was calculated from these values.

Example 1

45 wt parts of polypropylene [melt flow rate (MFR): 0.35 g/10 min], 55 wt parts of a polyolefin elastomer [melt flow rate (MFR): 6 g/10 min, JIS A hardness: 79°], 10 wt parts of magnesium hydroxide, 10 wt parts of carbon (trade name: "Asahi #35", supplied by Asahi Carbon Co., Ltd.), 1 wt part of stearic monoglyceride and 1 wt part of a fatty acid bisamide (bisamide laurate) were blended in a twin-screw kneader supplied by Japan Steel Works, LTD. (JSW) at a temperature of 200° C., and the resulting blend was extruded into strands and then molded into pellets after the strands were cooled with water. The pellets were charged into a single-screw extruder supplied by Japan Steel Works, LTD., and carbon dioxide gas was injected under an environment at a temperature of 220° C. and a pressure of 13 MPa (12 MPa after injection). The carbon dioxide gas was injected in an amount of 6 percent by weight relative to the total weight of the polymers. After the pellets were sufficiently saturated with carbon dioxide, they were cooled to a temperature suitable for foaming and extruded out of a die, to give a foam. The foam had an average cell diameter of 50 μm, a repulsive load when compressed to 0.1 mm of 0.02 MPa, and an apparent density of 0.03 g/cm³, and the thickness of the foam was 300 μm.

Comparative Example 1

45 wt parts of polypropylene [melt flow rate (MFR): 0.35 g/10 min], 55 wt parts of a polyolefin elastomer [melt flow rate (MFR): 6 g/10 min, JIS A hardness: 79°], 10 wt parts of magnesium hydroxide, 10 wt parts of carbon (trade name: "Asahi #35", supplied by Asahi Carbon Co., Ltd.) and 1 wt part of stearic monoglyceride were blended in a twin-screw kneader supplied by Japan Steel Works, LTD. (JSW) at a temperature of 200° C., and the resulting blend was extruded into strands and then molded into pellets after the strands were cooled with water. The pellets were charged into a single-screw extruder supplied by Japan Steel Works, LTD., and carbon dioxide gas was injected under an environment at a temperature of 220° C. and a pressure of 13 MPa (12 MPa after injection). The carbon dioxide gas was injected in an amount of 6 percent by weight relative to the total weight of the polymers. After the pellets were sufficiently saturated with carbon dioxide, they were cooled to a temperature suitable for foaming and extruded out of a die, to give a foam. The foam had an average cell diameter of 70 μm, a repulsive load when compressed to 0.1 mm of 0.05 MPa and an apparent density of 0.05 g/cm³, and the thickness of the foam was 500 μm.

Comparative Example 2

50 wt parts of polypropylene [melt flow rate (MFR): 0.35 g/10 min], 50 wt parts of a polyolefin elastomer [melt flow rate (MFR): 6 g/10 min, JIS A hardness: 79°], 10 wt parts of magnesium hydroxide, 10 wt parts of carbon (trade name: "Asahi #35", supplied by Asahi Carbon Co., Ltd.), 1 wt part of stearic monoglyceride, and 2 wt parts of a fatty acid amide (erucic amide) were blended in a twin-screw kneader supplied by Japan Steel Works, LTD. (JSW) at a temperature of 200° C., and the resulting blend was extruded into strands and then molded into pellets after the strands were cooled with water. The pellets were charged into a single-screw extruder supplied by Japan Steel Works, LTD., and carbon dioxide gas was injected under an environment at a temperature of 220° C. and a pressure of 13 MPa (12 MPa after injection). The carbon dioxide gas was injected in an amount of 6 percent by weight relative to the total weight of the polymers. After the pellets were sufficiently saturated with carbon dioxide, they were cooled to a temperature suitable for foaming and extruded out of a die, to give a foam. The foam had an average cell diameter of 150 μm, a repulsive load when compressed to 0.1 mm of 0.05 MPa and an apparent density of 0.05 g/cm³, and the thickness of the foam was 500 μm.

Comparative Example 3

A polyurethane foam [density: 0.4 g/cm³ (trade name: "SRS-40", supplied by ROGERS INOAC CORPORATION) was used as the waterproofing member. The PET film on the surface was removed, as sliced, to make the foam comparable with that in Example. The foam had an average cell diameter of 120 μm, a repulsive load when compressed to 0.1 mm of 1.60 MPa and an apparent density of 0.40 g/cm³, and the thickness of the polyurethane foam was 0.5 mm.

(Evaluation)

The waterproofness of the foams obtained in examples and comparative examples was evaluated by (Evaluation of drip-proofness) and (Evaluation of water resistance) described below. These evaluation results are summarized in Table 1.

(Evaluation of Drip-Proofness)

The drip-proofness test was carried out according to JIS C0920 (FIGS. 1, 2, 3 and 4). Each of the foams obtained in Examples and Comparative Examples was cut into a piece in a gasket-like shape, which was compressed to 60%, to give a test sample. The gasket-like shaped test sample and a water-sensitive paper were fixed to the window frame of an evaluation casing. In addition, water was sprayed on the evaluation casing from a position 20 cm above the evaluation casing, through holes (ϕ2) aligned at an interval of 20 mm on the bottom region of a container containing 4000 cm³ of water. If there is no change on the water-sensitive paper after 10 minutes, it was considered that there was no penetration of water into the evaluation casing and the test piece has drip-proofing function. Alternatively if there is change on the water-sensitive paper within 10 minutes, it was considered that there was penetration of water into the evaluation casing and the test piece did not have drip-proofness.

(Evaluation of Water Resistance)

Figure 5:
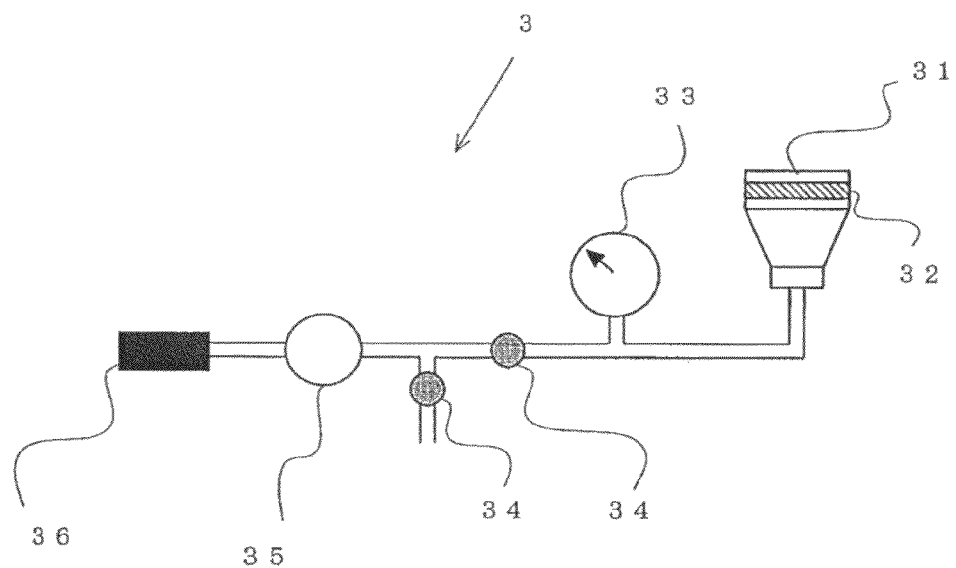
FIG. 5 is a schematic view showing the apparatus used in evaluation of water resistance.

The water resistance test was carried out according to the method of JIS L1092B (high-hydraulic pressure method) (FIG. 5). Each of the foams obtained in Examples and Comparative Examples was cut into a gasket-like shaped piece having a diameter of ϕ47 mm and a thickness of 0.5 mm, to give a test sample. The test sample was fixed to a test holder with its external face (face used as it faces outward) to be in contact with water; the water pressure on the side in contact with water was raised by a pump; permeation of water through the film was examined visually; and the water pressure (gauge pressure, kPa) when the permeation begun was used as the water resistance.

(Evaluation Criteria of Drip-Proofness)

O: There was no change on the water-sensitive paper after 10 minutes.

X: There was change on the water-sensitive paper after 10 minutes.

TABLE 1

|  | Example 1 | Comparative Example 1 | Comparative Example 2 | Comparative Example 3 |
|---|---|---|---|---|
| Apparent density (g/cm$^3$) | 0.03 | 0.05 | 0.05 | 0.40 |
| Repulsive load when compressed to 0.1 mm (Mpa) | 0.02 | 0.05 | 0.05 | 1.60 |
| Average cell diameter (μm) | 50 | 70 | 150 | 120 |
| Drip-proofness when compressed to 60% | ○ | ○ | X | X |
| Water resistance when a thickness of 0.5 mm (kPa) | 95 | 24 | 8 | 6 |

As obvious from Table 1, the foam obtained in Example 1 showed superior waterproofness. In particular, the drip-proofness evaluation results are the evaluation results when the foams are used as incorporated in actual products. Evaluation of the foam waterproofness, as determined as pressure resistance, showed that the foam obtained in Example 1 was a foam very superior in waterproofness. Thus, the waterproofness resin foam according to the present invention having a micro cell structure is usable as a sealing material with smaller apparent density and higher waterproofness and also as a waterproof gasket for cellular phones and small electronic devices.

INDUSTRIAL APPLICABILITY

The foam waterproofing material according to the present invention has large surface area even at the same density and low air permeability, showing superior waterproofness and is also favorably flexible enough to be compatible with minute clearance. It is thus is useful as a sealing material with smaller apparent density and higher waterproofness and also as a waterproof gasket for cellular phones and small electronic devices.

What is claimed is:

1. A foam waterproofing material comprising a foam, wherein:
    the foam comprises a thermoplastic elastomer, a thermoplastic polymer other than the thermoplastic elastomer, and one or more shrinkage inhibitors,
    the foam has a micro cell structure with an average cell diameter of 10 to 50μm and an apparent density of 0.01 to 0.050 g/cm$^3$,
    the one or more shrinkage inhibitors are selected from the group of fatty acid metal salt, fatty acid amide and fatty acid bisamide, and
    the foam has a water resistance (as determined by JIS L1092B method foam thickness: 0.5 mm) of 40 to 200 kPa.

2. The foam waterproofing material according to claim 1, wherein:
    the thermoplastic elastomer is selected from the group of: olefinic elastomers, styrenic elastomers and the hydrogenated derivative polymers thereof; thermoplastic polyester elastomers, thermoplastic polyurethane-based elastomers, thermoplastic acrylic elastomers and combinations thereof,
    the thermoplastic polymer other than the thermoplastic elastomer is selected from the group of: olefinic polymers, styrenic polymers, polyamides, polyamide-imides, polyurethanes, polyimides, polyether imides, acrylic resins, polyvinyl chlorides, polyvinyl fluorides, alkenyl aromatic resins, polyesters, polycarbonates, polyacetals, polyphenylene sulfides and combinations thereof,
    the shrinkage inhibitor is fatty acid amide, and
    a repulsive load when compressed to 0.1 mm (0.1 mm-compressive repulsion force) of the foam is 0.01 to 0.1 MPa.

3. The foam waterproofing material according to claim 2, wherein the foam has a closed-cell structure or a semi-open- and semi-closed-cell structure.

4. The foam waterproofing material according to claim 2, wherein the foam waterproofing material has a pressure-sensitive adhesive layer on one or both faces of the foam.

5. The foam waterproofing material according to claim 1, wherein the foam has a closed-cell structure or a semi-open- and semi-closed-cell structure.

6. The foam waterproofing material according to claim 1, wherein the foam waterproofing material has a pressure-sensitive adhesive layer on one or both faces of the foam.

7. The foam waterproofing material according to claim 6, wherein the pressure-sensitive adhesive layer is formed on the foam via a film layer.

8. The foam waterproofing material according to claim 6, wherein the pressure-sensitive adhesive layer is formed with an acrylic pressure-sensitive adhesive.

9. The foam waterproofing material according to claim 1, wherein the foam is formed in a step of impregnating a high-pressure inert gas in a thermoplastic polymer and leaving the resulting polymer under reduced pressure.

10. The foam waterproofing material according to claim 9, wherein the foam is formed in a step of impregnating a high-pressure inert gas in an unfoamed molding of a thermoplastic polymer and leaving the resulting polymer under reduced pressure.

11. The foam waterproofing material according to claim 9, wherein the foam is foamed by impregnating an inert gas in a molten thermoplastic polymer under pressure and leaving the resin under reduced pressure.

12. The foam waterproofing material according to claim 9, wherein the foam is formed as the resin is left under reduced pressure and additionally under heat.

13. The foam waterproofing material according claim 9, wherein the inert gas is carbon dioxide.

14. The foam waterproofing material according to claim 9, wherein the inert gas used during impregnation is in the supercritical state.

15. A foam waterproofing material according to claim 1, wherein the shrinkage inhibitor is a fatty acid bisamide.

* * * * *